(12) United States Patent
Woods (10) Patent No.: US 11,513,351 B2
(45) Date of Patent: Nov. 29, 2022

(54) AUGMENTED REALITY SYSTEM

(71) Applicant: Snap Inc., Santa Monica, CA (US)

(72) Inventor: David Woods, Milton (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/619,888

(22) PCT Filed: May 23, 2018

(86) PCT No.: PCT/GB2018/051406
§ 371 (c)(1),
(2) Date: Dec. 5, 2019

(87) PCT Pub. No.: WO2018/224802
PCT Pub. Date: Dec. 13, 2018

(65) Prior Publication Data
US 2020/0103650 A1    Apr. 2, 2020

(30) Foreign Application Priority Data
Jun. 6, 2017  (GB) .................................... 1708963

(51) Int. Cl.
*G02B 27/01*  (2006.01)
(52) U.S. Cl.
CPC .... *G02B 27/0172* (2013.01); *G02B 2027/012* (2013.01); *G02B 2207/123* (2013.01)
(58) Field of Classification Search
CPC ............ G02B 27/0101; G02B 27/0172; G02B 6/005; G02B 6/0023; G02B 2027/012; G02B 2027/013; G02B 2027/123; G02B 2027/0178
USPC ......................................................... 385/37
See application file for complete search history.

(56) References Cited

U.S. PATENT DOCUMENTS

| | | | | |
|---|---|---|---|---|
| 1,089,539 A | * | 3/1914 | Driver ...................... | G02C 7/16 2/12 |
| 1,683,505 A | * | 9/1928 | Stewart .................... | G02C 9/00 2/433 |
| 2,114,658 A | * | 4/1938 | Noffsinger ............... | G02C 7/16 2/12 |

(Continued)

FOREIGN PATENT DOCUMENTS

| | | |
|---|---|---|
| CN | 105589200 | 5/2016 |
| TW | 201510572 | 3/2015 |

(Continued)

OTHER PUBLICATIONS

International Search Report and Written Opinion dated Sep. 20, 2018 for international application PCT/GB2018/051406.

*Primary Examiner* — Robert Tavlykaev
(74) *Attorney, Agent, or Firm* — Schwegman Lundberg & Woessner, P.A.

(57) ABSTRACT

An augmented reality system (2) is disclosed for use in bright external conditions. The augmented reality system includes: a projector (6), a substantially transparent optical component (4) that provides augmented reality light to a user, and a stray light rejection layer (12). The stray light rejection layer (12) further comprises a plurality of slats (16) arranged at a plurality of respective angles to effectively reduce high angle incident light from the external environment from reaching the transparent optical component (4).

18 Claims, 4 Drawing Sheets

(56) References Cited

U.S. PATENT DOCUMENTS

| | | | | |
|---|---|---|---|---|
| 2,232,455 | A * | 2/1941 | Hebrard | G02C 7/16 |
| | | | | 351/46 |
| 2,824,308 | A * | 2/1958 | Duncan | G02C 7/16 |
| | | | | 2/433 |
| 3,756,703 | A * | 9/1973 | Nelson | A61F 9/022 |
| | | | | 351/45 |
| 4,711,512 | A | 12/1987 | Upatnieks | |
| 4,869,584 | A * | 9/1989 | Dion | G02C 7/16 |
| | | | | 351/45 |
| 4,953,231 | A * | 9/1990 | Burnett | G02C 7/16 |
| | | | | 160/176.1 R |
| 5,016,950 | A * | 5/1991 | Smith | G02B 27/42 |
| | | | | 359/15 |
| 9,644,816 | B1 * | 5/2017 | Barnidge | F21V 3/02 |
| 9,733,475 | B1 * | 8/2017 | Brown | G02B 27/0101 |
| 2014/0168260 | A1 | 6/2014 | O'Brien et al. | |
| 2016/0116742 | A1 | 4/2016 | Wei | |
| 2017/0139210 | A1 * | 5/2017 | Vallius | G02B 6/0026 |
| 2017/0315356 | A1 * | 11/2017 | Tervo | G02B 27/4205 |
| 2018/0113313 | A1 * | 4/2018 | Tekolste | G02B 5/1866 |
| 2018/0376124 | A1 * | 12/2018 | Zhou | G02B 27/14 |
| 2019/0064526 | A1 * | 2/2019 | Connor | G06T 19/006 |
| 2019/0346600 | A1 * | 11/2019 | Wheatley | G02B 5/201 |

FOREIGN PATENT DOCUMENTS

| | | |
|---|---|---|
| WO | 2013128615 | 9/2013 |
| WO | 2018224802 | 12/2018 |

\* cited by examiner

AUGMENTED REALITY SYSTEM

RELATED APPLICATIONS

This application is a national stage filing under 35 U.S.C. § 371 of International Patent Application No. PCT/GB2018/051406, filed May 23, 2018, which claims priority to GB1708963.2 filed Jun. 6, 2017, each of which is incorporated by reference herein in its entirety.

The present invention relates to an augmented reality system, and a technique for improving use in bright light conditions such as daylight.

Head-mounted augmented reality systems can be worn on a user's head to augment a user's perception of the real world by supplying additional light. Known head-mounted systems include glasses and helmet structures. Augmented reality systems also include head-up displays that can be implemented in vehicles, such as in cars, trucks or also in aircraft cockpits.

Augmented reality light may be provided to users using a waveguide structure. Diffraction gratings are positioned on or in the waveguides to couple light from a projector into a waveguide. A further diffraction grating structure can then be used to couple light out of the waveguide and towards a user. Other augmented reality technologies may be employed to generate similar results. For example, prism projector or prism-based design augmented reality systems may use multiple lenses, or prisms, to control the optical pathway of light from a display component to a user.

The optical components, such as the waveguides or prisms, in these applications are typically transparent so that the user can view light from the projector as well as light from their external environment.

However, many augmented reality systems present difficulties when they are used in bright light conditions, including daylight. These difficulties can arise because the optical components intended for controlling light from the projectors can also interact with light from the outside world.

Specifically, it has been found that when incident light rays from an external source encounter an optical component some of the light rays may be diffracted or refracted towards a user's eyes. If the source is bright enough, these stray light rays can create an unwelcome rainbow effect over the user's field of view. This rainbow effect may impair a user's vision of the external environment or decrease the visibility of the augmented computer-generated information. The rainbow effect is particularly severe when a bright light is present in the external environment is at a high angle relative to the user's line of sight; examples of problematic light sources include spot lights at high elevation angles, ceiling lights in an internal environment, or the sun when it is high in the sky and the user's line of sight is in the horizontal plane.

Similarly, reflective or refractive structures integral to particular augmented reality technologies, may also suffer from similar unwanted ray deflections.

An object of the invention is to improve the ability to use augmented reality systems in diverse lighting conditions, and to reduce undesirable optical effects being experienced by a user.

According to an aspect of the invention there is provided an augmented reality system comprising: a projector; a substantially transparent optical component arranged to receive light from the projector and provide augmented reality light to a user's notional eye position; and a stray light rejection layer for the substantially transparent optical component, wherein the stray light rejection layer comprises a plurality of slats, where the plurality of slats each comprises an axis, and wherein the axes of the plurality of slats are arranged at a plurality of respective angles, with the axes of the plurality of slats each directed towards the user's notional eye position.

In this way, it is possible for a user to view projected augmented reality images in bright external conditions with reduced stray light problems, for example, in a sunny outdoor environment with little cloud cover. The stray light rejection layer can advantageously reduce high angle incident rays of external light from reaching the substantially transparent optical component. This rejection of stray light can in turn reduces the amount of incident light that may be diffracted or refracted by the substantially transparent optical component towards a user's eyes. Advantageously this reduces undesirable optical effects such as rainbowing. Similarly, other augmented reality technologies may benefit as well.

The augmented reality system may be a head-mounted augmented reality system, wherein the augmented reality system further comprises a head mounting configured to space the substantially transparent optical component at a position with respect to the user's notional eye position.

The head mounting may help to position the substantially transparent optical component so that the slats are oriented with their axes directed towards the user's notional eye position. The user's notional eye position may represent a common focal point by which the plurality of respective angles can be determined. In use, the same head mounting may space the substantially transparent optical component at a different position for different user's eyes, due to different head shapes. Preferably the axes are oriented towards a notional eye position, which may be determined as an average expected position for a user's eye.

Preferably the plurality of angles is determined from a notional forward-looking direction from the user's notional eye position. In this way, it is possible for an axis of a slat to be determined by an angle between the notional forward-looking direction and the axis where the user's notional eye position acts as a common focal point. Each angle may be a plane angle for determining the axes of linear slats. Alternatively each angle may be a solid angle for determining slats that have a curved portion. In another example some angles may be plane angles for linear slats that are disposed horizontally with respect to the user's notional eye position and other angles may be plane angles for linear slats that are disposed vertically with respect to the user's notional eye position.

At least a portion of each slat may be curved. In this way, it is possible for the plurality of slats to block high angle incident light from both the horizontal and vertical directions. Each slat may have a straight horizontal section with curved ends, where the ends curve toward a horizontal centreline of the substantially transparent optical component (in line with a centreline of the user's notional eye position or line of sight).

Each slat may be a frustum around the notional forward-looking direction such that the plurality of slats forms a set of nested frusta. Each frustum in the plurality of slats may be a frustum of a cone. A plurality of circular slats would appear like a set of concentric circles to a user along the notional forward-looking position. Alternatively each slat may be pill-shaped where the slat has two planar sections with half a frustum on each end. In another example each frustum may be a frustum of a pyramid.

Preferably the profile dimensions of each slat and the distance between the stray rejection layer and the user's notional eye position are selected such that the plurality of slats is substantially invisible to the user. In this way, it is possible for a user not to significantly notice the slats in the augmented reality system as the user looks along the axes of the plurality of slats. Advantageously, a user can view the thinnest possible profile, or smallest cross-section, of a slat. Therefore, the plurality of slats can least impede a user's view of the physical world beyond the stray light rejection layer. Typically, a human eye is capable of seeing a particle size of approximately 50 microns. For example, each slat may be less than 50 microns thick. Additionally, the plurality of slats may be spaced at a distance away from the user's notional eye position such that the user cannot focus on the plurality of slats.

Preferably the plurality of slats is further arranged such that there is a gap having at least a predetermined distance between each slat. In this way, it is possible for a user not to significantly notice the plurality of slats arranged in the augmented reality system. For example, if the predetermined dimension between each slat for a plurality slats is too small there may be a collective visual impairment.

Preferably the head mounting defines a vertical direction from the perspective of a user, and the plurality of slats is preferably arranged to reject stray light in the vertical direction. In this way, it is possible for the plurality of slats to reduce high angle stray light that is incident from the up or down directions with respect to the head mounting, while the user's line of sight is in the horizontal plane.

Each slat may be linear and the plurality of slats may be disposed horizontally with respect to the user's notional eye position. In the majority of situations the user's line of sight is in the horizontal plane, and it is desirable to reduce undesirable optical effects from light sources that are vertically displaced from that horizontal plane. For example, a user in an upright position may experience high angle stray light that is transmitted from the sun overhead or from reflections from below the user's line of sight. Alternatively some slats may be disposed horizontally with respect to the user's notional eye position and other angles may be disposed vertically with respect to the user's notional eye position.

The stray light rejection layer may be an adhesive film. In this way, it is possible for the stray light rejection layer to be a separate component to the waveguide that can be fixed onto a surface of the substantially transparent optical component.

Preferably the substantially transparent optical component of the augmented reality system comprises an internal surface positioned to face a user and an external surface positioned to face the external environment, and wherein the stray light rejection layer adheres onto the external surface. In this way, it is possible for a stray light rejection layer to be adhered onto the external surface of a substantially transparent optical component and reduce external incident rays from reaching the substantially transparent optical component.

The head mounting may comprise a frame, wherein the substantially transparent optical component and the projector are mounted on the frame; and a transparent substrate, wherein the stray light rejection layer adheres onto the transparent substrate. In this way, it is possible to have a stray light rejection layer that is entirely separated from the substantially transparent optical component. This may allow more design configurations or orientations within a head-mounted augmented reality system in which a projector can transmit light into a substantially transparent optical component. For example, a projector that is mounted on a frame may project light into a substantially transparent optical component from the external surface but would have to be positioned or oriented at angles at which the projected rays are not adversely reduced by the stray light rejection layer.

Preferably the plurality of slats is opaque. In this way, it is possible for the plurality of slats to block incident light from the external environment. In another example, high angle incident light from the external environment could be reduced by the plurality of slats reflecting light away from the substantially transparent optical component.

Preferably the substantially transparent optical component is a waveguide.

Preferably the augmented reality system further comprises an input diffractive optical element configured to receive light from the projector and to couple it into the waveguide; and an output diffractive optical element configured to couple light out of the waveguide towards a user.

The augmented reality system may be a head-up display augmented reality system. For example, the augmented reality system may be incorporated into a vehicle dashboard. Alternatively, the augmented reality system may be a stand-alone device that can be positioned on a dashboard or in a cockpit. In another example, the augmented reality system may be incorporated into a windscreen. A user may use the seat adjustment in a vehicle to match, or closely match, the user's actual eye position with the user's notional eye position in the augmented reality system.

Embodiments of the invention are now described, by way of example, with reference to the drawings, in which:

FIG. 1b is a detailed side view of the augmented reality system shown in FIG. 1a;

Figure 1A:
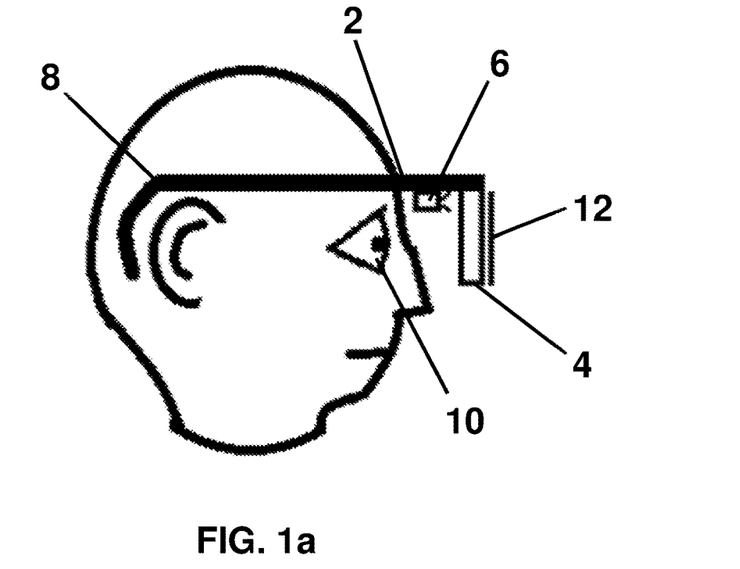
FIG. 1a is a side view of a head-mounted augmented reality system on a user's head.
Figure 1B:
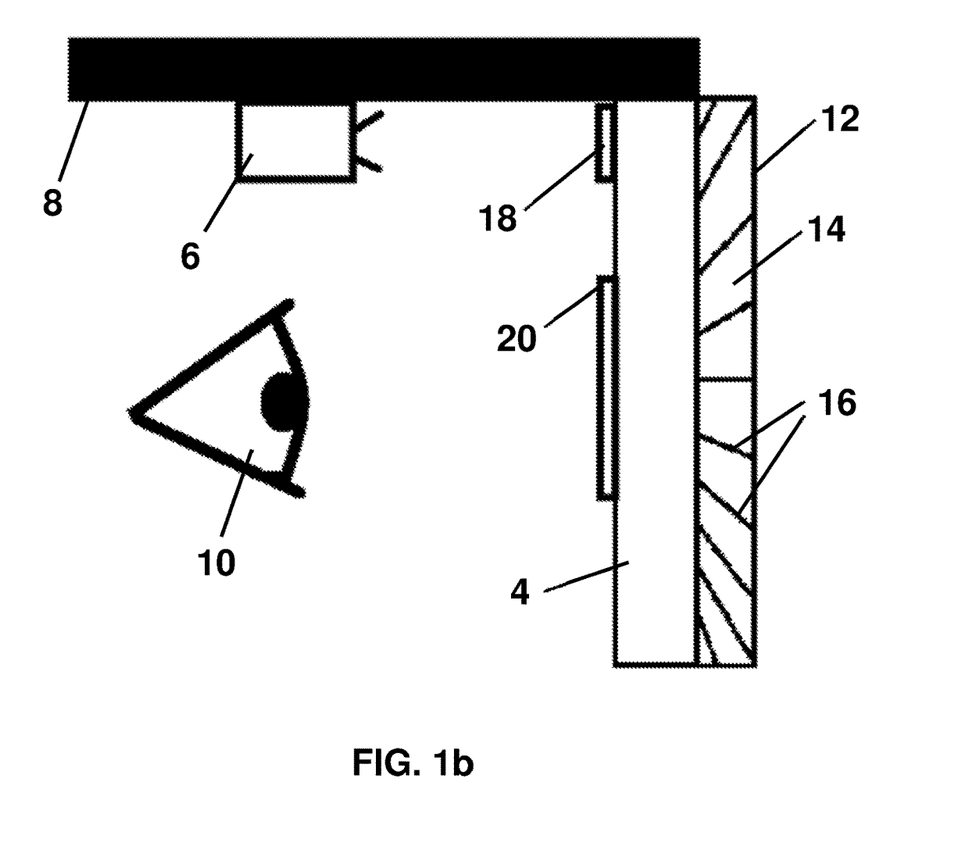

As shown in FIGS. 1a and 1b, a head-mounted augmented reality system 2 has a waveguide 4 and a projector 6, wherein the projector 6 is arranged to provide light to the waveguide 4. The head-mounted augmented reality system 2 has a head mounting 8 on which the waveguide 4 and the projector 6 are fixed. The head mounting 8 is further configured to space the waveguide 4 at a position with respect to a user's notional eye position 10. In one arrangement the head mounting 8 is a frame similar to a frame of a pair of spectacles. In another arrangement the head mounting 8 is a helmet. Alternative optical components other than a waveguide, for example a prism (see FIG. 3) for use in a head-mounted augmented reality system would readily occur to a person skilled in the art.

A stray light rejection layer 12 is positioned on the outside surface of the waveguide 4. The stray light rejection layer 12 comprises a transparent base material 14 and a plurality of slats 16. The plurality of slats 16, or louvers, is arranged in the stray light rejection layer 12 at a plurality of angles. In one arrangement the plurality of slats 16 is made of an opaque light-blocking material. Additionally, the plurality of slats 16 can reflect light away from the waveguide 4. In the embodiment depicted in FIG. 1 there is only a small number of slats 16, but in other embodiments a larger number could be provided.

An input diffractive optical element 18 is positioned on the waveguide 4 to receive light from the projector 6 and to couple the light into the waveguide 4. An output diffractive optical element 20 is positioned on the waveguide 4 to couple light within the waveguide 4 out of the waveguide 4 towards the user. In this way, light from the projector 6 can augment a user's view of the external world, which they can also perceive through the transparent waveguide 4.

The head mounting 8 is configured to position the waveguide 4 and the stray rejection layer 12 at a desirable distance from the user's notional eye position 10 such that a user cannot focus on the plurality of slats 16. The user's notional eye position 10 is a spatial position where an eye of an average user is likely to be located. Users will have expectedly have differently shaped heads, and in any individual case the actual position of a user's eye may be somewhat different to the user's notional eye position 10. A human eye cannot easily focus on an object less than 6.5 cm away. Therefore a head-mounted augmented reality system may position a stray rejection layer 12 less than 6.5 cm away from the user's notional eye position 10. For example, the head mounting 8 is configured to space the stray light rejection layer 12 away from the user's notional eye position 10 by a straight horizontal distance of 2 to 3 cm. Thus, the waveguide 4 and the stray light rejection layer 12 are intended for "near-eye" applications.

The head mounting 8 is configured to define a vertical direction from the perspective of a user when worn on the user's head. The plurality of slats 16 is arranged to reject stray light in the vertical direction when the user's line of sight is in the horizontal plane. For example, each slat may be positioned horizontally with respect to the vertical direction such that stray light from overhead or below a user's line of sight may be blocked.

A stray light rejection layer 12 is positioned on the outside surface of the waveguide 4 to prevent undesired high angle stray light from the external environment from reaching the waveguide 4. In one example the stray light rejection layer 12 is an adhesive film that can be stuck onto an external surface of the waveguide 4. Alternatively, the stray light rejection layer 12 and the waveguide 4 may exist as a single component, where the plurality of slats 16 is arranged towards the external surface of the single component.

Each of the plurality of slats 16 has an axis, and the axes are arranged at a plurality of angles. The slats 16 are arranged so that each of the axes is directed towards the user's notional eye position 10. In this way, the thin edges of the slats are presented in profile to the user's notional eye position. The arrangement of slats 16 means that these edges are barely perceptible to a user. For example, a slat may have a thin cuboidal shape, wherein a larger rectangular section blocks stray light and a user wearing the system can only see an edge, or a smaller rectangular section, of the cuboidal slat. Alternative shapes for slats would readily occur to a person skilled in the art.

The dimensions of each slat may also be selected to minimise visibility to a user. For example, each slat may be 10 microns thick and 200 microns long. In addition, the plurality of slats 16 is arranged within the waveguide 4 such that there is a gap having a minimum dimension between each slat to allow desired light from the external environment through the stray light rejection layer 12 into the waveguide 4. For example, the minimum gap distance between each slat may be 115 microns to ensure that sufficient external light passes through the stray light rejection layer 12.

In use, a user would position the head-mounted augmented reality system 2 on their head using the head mounting 8. The user's eye would be positioned close to the user's notional eye position 10, which is defined by the head mounting. The slats 16 would be oriented with the axes substantially oriented towards the user's eye position. The slats 16 are oriented and positioned so that they can reject light at high elevation angles but can continue to allow the user normal viewing. The arrangement of slats 16 advantageously reduces undesirable optical effects such as rainbowing.

Figure 2:
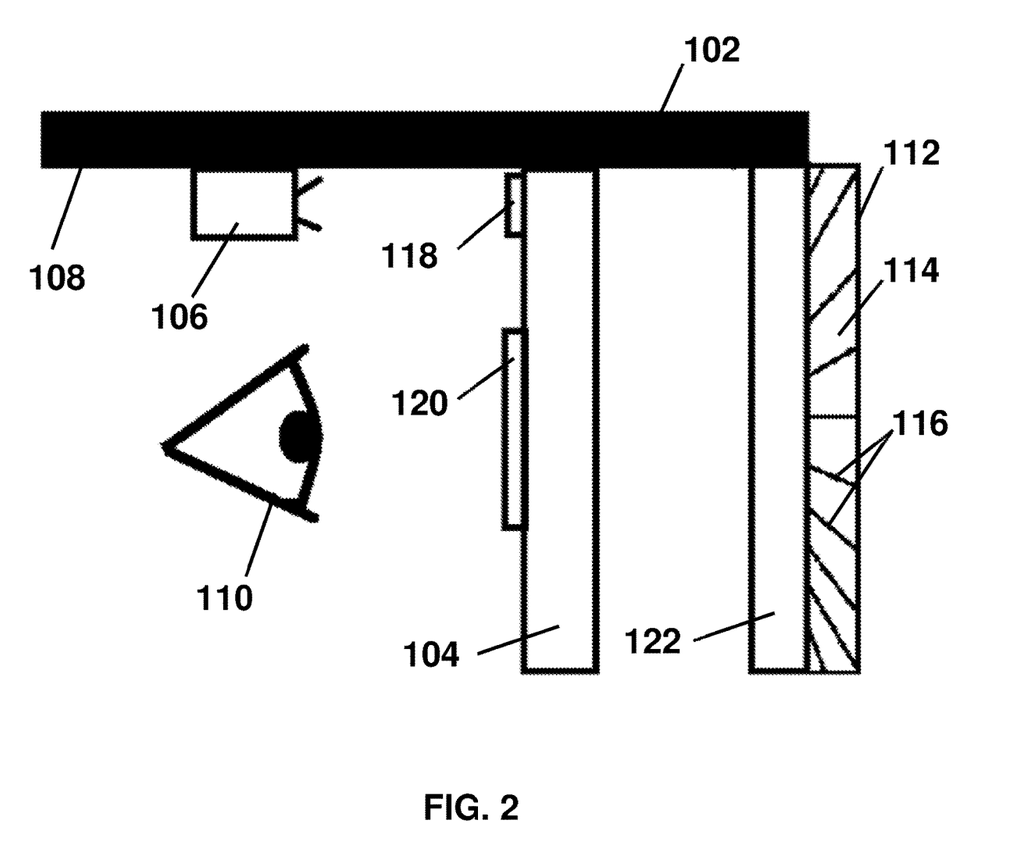
FIG. 2 is a detailed side view of another augmented reality system in another embodiment of the invention.

FIG. 2 is an embodiment of the head-mounted augmented reality system 102, wherein a head mounting 108 comprises a frame, on which a waveguide 104, a projector 106 and a transparent substrate 122 are mounted. The head mounting 108 is configured to space the waveguide 104 at a position with respect to a user's notional eye position 110. The transparent substrate 122 is a separate component to the waveguide 104. A stray light rejection layer 112 is adhered onto a surface of the transparent substrate 122. The stray light rejection layer 112 comprises a transparent base material 114 and a plurality of slats 116. The plurality of slats 116 is arranged in the stray light rejection layer 112 at a plurality of angles.

An input diffractive optical element 118 is positioned on the waveguide 104 to receive light from the projector 106 and to couple the light into the waveguide 104. An output diffractive optical element 120 is positioned on the waveguide 104 to couple light within the waveguide 104 out of the waveguide 104 towards the user.

The transparent substrate 122 can be used as a barrier to protect the waveguide 104 from physical damage and/or used as a surface on which the stray light rejection layer 112 may be adhered. In one arrangement the head mounting 108 is a helmet with a visor structure as the transparent substrate 122.

Figure 3:
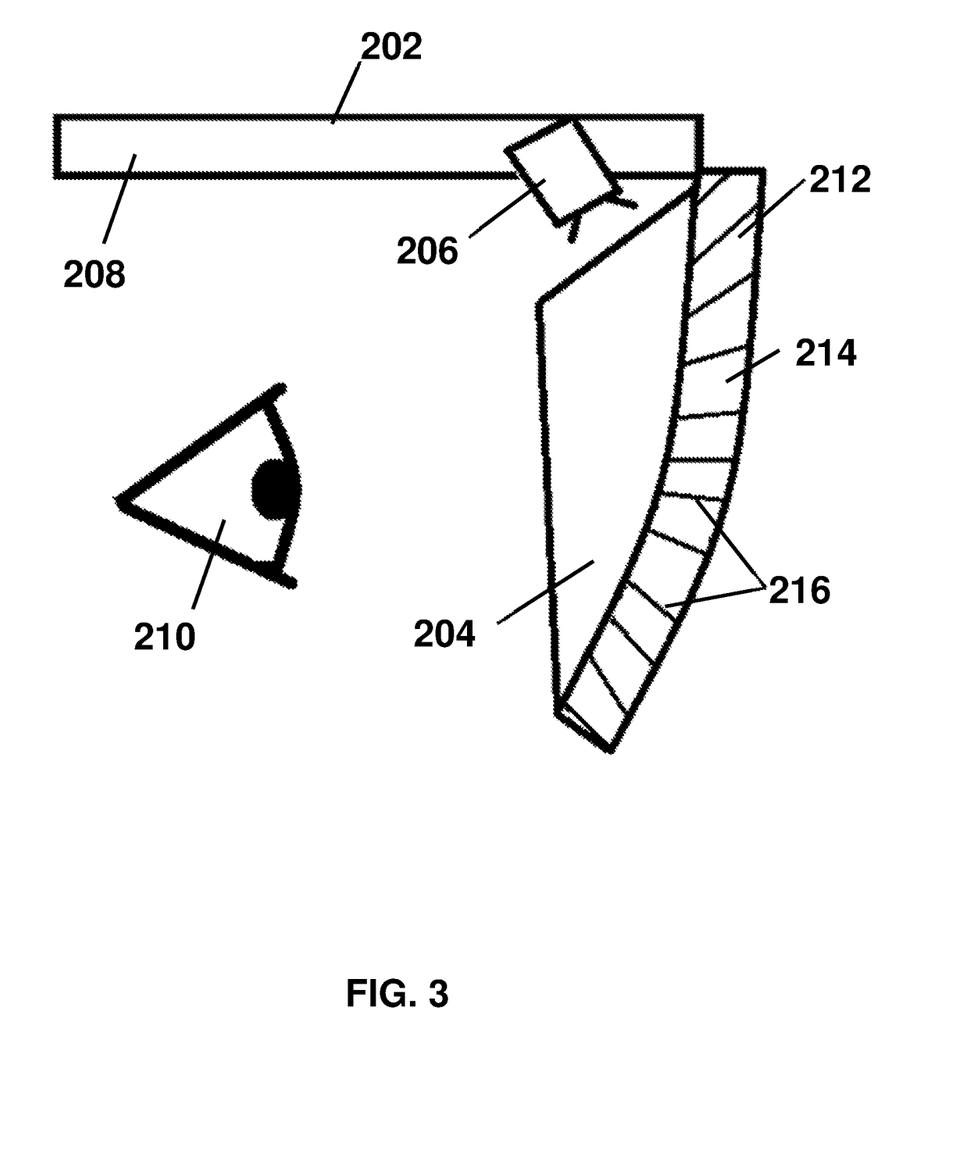
FIG. 3 is a side view of another augmented reality system in another embodiment of the invention.

FIG. 3 is another embodiment of the head-mounted augmented reality system 202, wherein a head mounting 208 comprises a frame, on which a prism 204 and a projector 206 are mounted. The head mounting 208 is configured to space the prism 204 at a position with respect to a user's notional eye position 210. A stray light rejection layer 212 is positioned on the outside surface of the prism 204 to prevent undesired high angle stray light from the external environment from reaching the prism 204. The stray light rejection layer 212 comprises a transparent base material 214 and a plurality of slats 216. The plurality of slats 216 is arranged in the stray light rejection layer 212 at a plurality of angles.

In one example the stray light rejection layer 212 is an adhesive film that can be stuck onto an external surface of the prism 204. Alternatively, the stray light rejection layer 212 and the prism 204 may exist as a single component, where the plurality of slats 216 is arranged towards the external surface of the single component.

Figure 4:
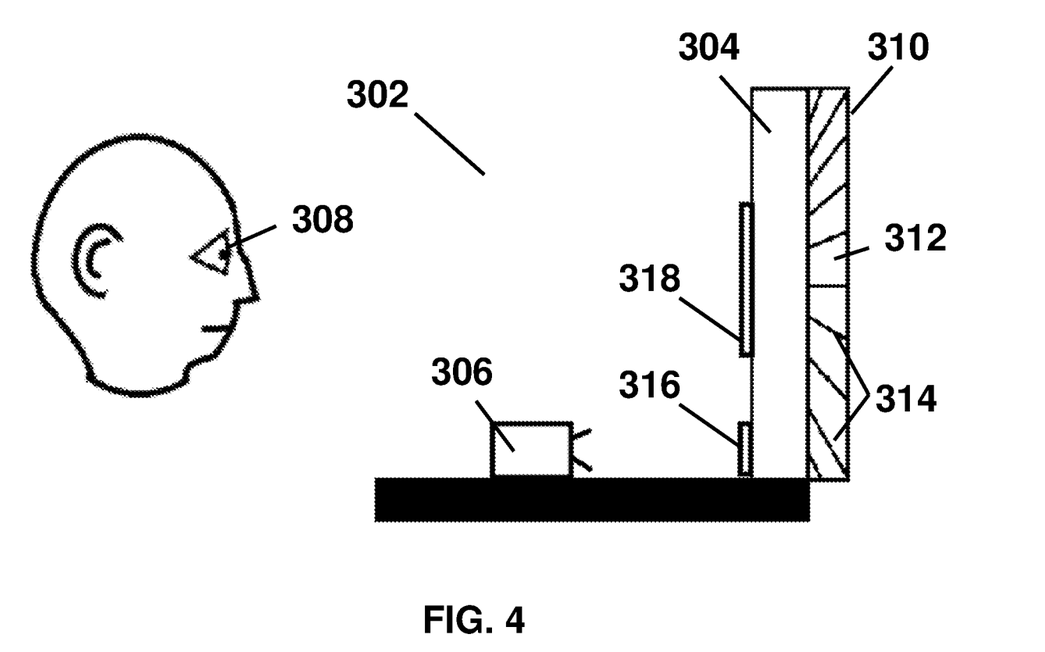
FIG. 4 is a side view of the augmented reality system as a head-up display system.

As shown in FIG. 4, a head-up display augmented reality system 302 has a waveguide 304 and a projector 306, wherein the projector 306 is arranged to provide light to the waveguide 304. The waveguide 304 is configured to define a user's notional eye position 308.

A stray light rejection layer 310 is positioned on the outside surface of the waveguide 304. The stray light rejection layer 310 comprises a transparent base material 312 and a plurality of slats 314. The plurality of slats 314, or louvers, is arranged in the stray light rejection layer 310 at a plurality of angles. In one arrangement the plurality of slats 314 is made of an opaque light-blocking material. Additionally, the plurality of slats 314 can reflect light away from the waveguide 304.

In the embodiment depicted in FIG. 4 there is only a small number of slats 314, but in other embodiments a larger number could be provided. The dimensions of the thin edges of each slat (presented in profile to the user's notional eye position) and the number of slats are selected such that the plurality of slats 314 is barely perceptible to the user.

An input diffractive optical element 316 is positioned on the waveguide 304 to receive light from the projector 306 and to couple the light into the waveguide 304. An output diffractive optical element 318 is positioned on the waveguide 304 to couple light within the waveguide 304 out of the waveguide 304 towards the user. In this way, light from the projector 306 can augment a user's view of the external world, which they can also perceive through the transparent waveguide 304.

Figure 5:
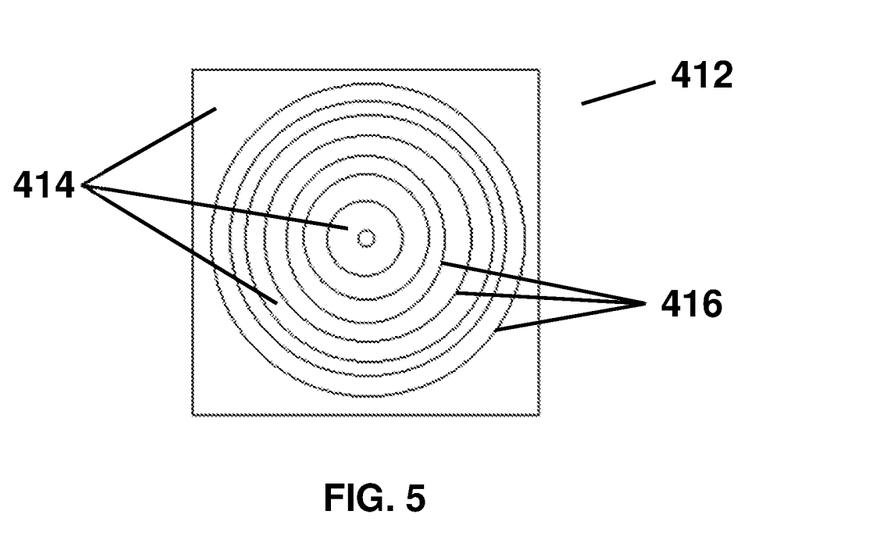
FIG. 5 is front view of a plurality of slats in another embodiment of the invention.

FIG. 5 in another embodiment of the stray light rejection layer 412 in a notional forward-looking direction from a user's notional eye position. The stray light rejection layer 412 comprises a transparent base material 414 and a plurality of slats 416. The plurality of slats 416, or louvers, is arranged in the stray light rejection layer 412 at a plurality of angles.

Each of the plurality of slats 416 has an axis, and the axes are arranged at a plurality of angles. The plurality of angles is a plurality of solid angles determined from the user's notional eye position, such that the slats 416 are arranged so that each of the axes is directed towards the user's notional eye position. In this way, the thin edges of the slats are presented in profile to the user's notional eye position. The arrangement of slats 416 means that these edges are barely perceptible to a user.

Each slat has the shape of a frustum, or section of a cone, such that a slat appears circular in a two-dimensional or face-on view. The plurality of slats 416 is a set of nested cones in the transparent base material 414, and appears like a set of concentric circles when facing the user's line of sight. Alternative shapes for slats would readily occur to a person skilled in the art, such as pill-shaped, pyramid or oval slats.

Alternative configurations of a stray light rejection layer for use in an augmented reality system would readily occur to a person skilled in the art.

The invention claimed is:

1. An augmented reality system comprising:
a projector;
a substantially transparent optical component comprising an internal surface positioned to face a user and an external surface positioned to face an external environment, the substantially transparent optical component arranged to receive light from the projector and light from the external environment and to provide, through an output diffractive optical element positioned on the substantially transparent optical component, augmented reality light to the user's notional eye position; and
a stray light rejection layer for the substantially transparent optical component, wherein the stray light rejection layer is arranged on a same side of the substantially transparent optical component as the external surface of the substantially transparent optical component and comprises a plurality of slats, wherein each of the plurality of slats defines an axis, and wherein the axes of the plurality of slats are arranged in the stray light rejection layer at a plurality of different respective angles determined from a notional forward-looking direction from the user's notional eye position, with the axes of the plurality of slats each directed towards the user's notional eye position, and wherein each slat is a frustum around the notional forward-looking direction such that the plurality of slats forms a set of nested frusta;
wherein the stray light rejection layer is configured to prevent high angle incident rays of light from the external environment that are beyond one of the plurality of respective angles from reaching the output diffractive optical element and creating rainbow effects caused by diffraction of the high angle incident rays of light.

2. The augmented reality system of claim 1 is a head-mounted augmented reality system further comprising a head mounting configured to space the substantially transparent optical component at a position with respect to the user's notional eye position.

3. The augmented reality system of claim 2, wherein the head mounting defines a vertical direction from the perspective of a user, and wherein the plurality of slats is arranged to reject stray light in the vertical direction.

4. The augmented reality system of claim 3, wherein each slat is linear and wherein the plurality of slats are disposed horizontally with respect to the user's notional eye position.

5. The augmented reality system of claim 2, wherein the head mounting comprises:
a frame, wherein the substantially transparent optical component and the projector are mounted on the frame; and
a transparent substrate, wherein the stray light rejection layer adheres onto the transparent substrate.

6. The augmented reality system of claim 1, wherein at least a portion of each slat is curved.

7. The augmented reality system of claim 1, wherein each frustum is a frustum of a cone.

8. The augmented reality system of claim 1, wherein profile dimensions of each slat and a distance between the stray rejection layer and the user's notional eye position are selected such that the plurality of slats is substantially invisible to the user.

9. The augmented reality system of claim 1, wherein the plurality of slats is further arranged such that there is a gap having at least a predetermined dimension between each slat.

10. The augmented reality system of claim 1, wherein the stray light rejection layer is an adhesive film.

11. The augmented reality system of claim 1, wherein the stray light rejection layer adheres onto the external surface of the substantially transparent optical component.

12. The augmented reality system of claim 1, wherein the plurality of slats is opaque.

13. The augmented reality system of claim 1, wherein the substantially transparent optical component is a waveguide.

14. The augmented reality system of claim 13, further comprising:
an input diffractive optical element configured to receive light from the projector and to couple it into the waveguide.

15. The augmented reality system of claim 1, comprising a head-up display augmented reality system.

16. An augmented reality system comprising:
a projector;
a substantially transparent optical component comprising an internal surface positioned to face a user and an external surface positioned to face an external environment, the substantially transparent optical component arranged to receive light from the projector and light from the external environment and to provide, through an output diffractive optical element positioned on the substantially transparent optical component, augmented reality light to the user's notional eye position; and a stray light rejection layer for the substantially transparent optical component, wherein the stray light rejection layer is adhered onto the external surface of the substantially transparent optical component and comprises a plurality of slats, wherein each of the slats of the plurality of slats defines an axis, and wherein the axes of the plurality of slats are arranged in the stray light rejection layer at a plurality of different respective angles determined from a notional forward-looking direction from the user's notional eye position, with the axes of the plurality of slats each directed towards the user's notional eye position, and wherein each slat is a frustum around the notional forward-looking direction such that the plurality of slats forms a set of nested frusta;

wherein the stray light rejection layer is configured to prevent high angle incident rays of light from the external environment that are beyond one of the plurality of respective angles from reaching the output diffractive optical element.

17. The augmented reality system of claim 16, wherein the substantially transparent optical component is a planar waveguide.

18. An augmented reality system comprising:

a substantially transparent optical component comprising an internal surface positioned to face a user and an external surface positioned to face an external environment, the substantially transparent optical component arranged to receive light from a projector and light from the external environment and to provide, through an output diffractive optical element positioned on the substantially transparent optical component, augmented reality light to a notional position of the user's eye; and a stray light rejection layer for the substantially transparent optical component, wherein the stray light rejection layer is arranged on a same side of the substantially transparent optical component as the external surface of the substantially transparent optical component and comprises a plurality of slats, wherein each of the slats of the plurality of slats defines an axis, and wherein the axes of the plurality of slats are arranged in the stray light rejection layer at a plurality of different respective angles determined from a notional forward-looking direction from the user's notional eye position, with the axes of the plurality of slats each directed towards the notional position of the user's eye, and wherein each slat is a frustum around the notional forward-looking direction such that the plurality of slats forms a set of nested frusta that shield the output diffractive optical element from high angle stray rays of light in the external environment that are incident upon and propagate in the substantially transparent optical component in order to prevent diffraction of these high angle stray rays of light by the output diffractive optical element.

* * * * *